United States Patent [19]
Pabon, Jr. et al.

[11] Patent Number: 5,997,763
[45] Date of Patent: Dec. 7, 1999

[54] CORROSION INHIBITING ANTIFREEZE COMPOSITIONS CONTAINING VARIOUS CARBOXYLIC ACIDS

[75] Inventors: Raul Antonio Pabon, Jr., Houston, Tex.; Nelson Eduardo Prieto, Jacksonville, Fla.

[73] Assignee: Shell Oil Company, Houston, Tex.

[21] Appl. No.: 09/067,161

[22] Filed: Apr. 27, 1998

[51] Int. Cl.[6] .................................................. C09K 5/00
[52] U.S. Cl. .................................. 252/79; 252/76; 422/7
[58] Field of Search ................................. 252/79, 76, 75; 422/7, 17, 13

[56] References Cited

U.S. PATENT DOCUMENTS

| | | | |
|---|---|---|---|
| 3,573,225 | 3/1971 | Kondo | 252/392 |
| 4,219,433 | 8/1980 | Manabe et al. | 252/75 |
| 4,306,986 | 12/1981 | Schiessl | 252/77 |
| 4,324,675 | 4/1982 | Barthold et al. | 252/79 |
| 4,338,209 | 7/1982 | Manabe et al. | 252/75 |
| 4,342,596 | 8/1982 | Conner, Sr. | 106/14.13 |
| 4,389,371 | 6/1983 | Wilson et al. | 422/15 |
| 4,391,722 | 7/1983 | Schwartz et al. | 252/73 |
| 4,406,811 | 9/1983 | Christensen et al. | 252/180 |
| 4,450,088 | 5/1984 | Wilson et al. | 252/75 |
| 4,452,758 | 6/1984 | Wilson et al. | 422/15 |
| 4,534,875 | 8/1985 | Rose | 252/71 |
| 4,587,028 | 5/1986 | Darden | 252/76 |
| 4,588,513 | 5/1986 | Triebel et al. | 252/75 |
| 4,606,837 | 8/1986 | McEntire et al. | 252/73 |
| 4,647,392 | 3/1987 | Darden et al. | 252/75 |
| 4,719,035 | 1/1988 | Palmer | 252/390 |
| 4,759,864 | 7/1988 | Van Neste et al. | 252/75 |
| 4,851,145 | 7/1989 | Van Neste et al. | 252/75 |
| 5,021,459 | 6/1991 | Goettsche | 514/663 |
| 5,073,283 | 12/1991 | Goddard et al. | 252/78.5 |
| 5,085,793 | 2/1992 | Burns et al. | 252/79 |
| 5,110,494 | 5/1992 | Beck | 252/156 |
| 5,242,621 | 9/1993 | Miller et al. | 252/396 |
| 5,269,956 | 12/1993 | Miller et al. | 252/67 |
| 5,366,651 | 11/1994 | Maes et al. | 252/76 |
| 5,387,360 | 2/1995 | Uekusa et al. | 252/73 |
| 5,489,391 | 2/1996 | Nawa et al. | 252/75 |

FOREIGN PATENT DOCUMENTS

| | | | |
|---|---|---|---|
| 20042 | 12/1980 | European Pat. Off. | C23F 11/14 |
| 3223940 | 12/1983 | Germany . | |
| 7-157886 | 6/1995 | Japan . | |

OTHER PUBLICATIONS

"A Rapid Method to Predict the Effectiveness of Inhibited Engine Coolants in Aluminum Heat Exchangers," by R. R. Wiggle and V. Hospadaruk, Copyright© 1980 Society of Automotive Engineers, Inc., pp. 1–5. No month available.

*Primary Examiner*—Christine Skane
*Attorney, Agent, or Firm*—Dennis V. Carmen

[57] ABSTRACT

An anti-freeze concentrate made by adding together at least:
  a) an alkylene glycol;
  b) an effective corrosion inhibiting amount, or more, of an unsubstituted benzoic acid; and
  c) an effective corrosion inhibiting amount, or more, of a $C_7$–$C_{14}$ monocarboxylic acid.

This formulation is particularly effective at inhibiting corrosion in coolants which are free of borates, primary and secondary amines, phosphates, silicates, as well as those coolants which are free of p-tertbutyl benzoic acid.

51 Claims, 2 Drawing Sheets

CORROSION INHIBITING ANTIFREEZE COMPOSITIONS CONTAINING VARIOUS CARBOXYLIC ACIDS

1. FIELD OF THE INVENTION

The present invention relates to glycol-based antifreeze compositions, particularly to corrosion-inhibiting antifreeze compositions useful in internal combustion engine service containing a combination of an unsubstituted benzoic acid and a $C_7$–$C_{14}$ monocarboxylic acid.

2. BACKGROUND OF THE INVENTION

Current progress in automotive technology is leading to the development of anti-freeze compositions which provide extended life protection against corrosion or pitting of metal surfaces. In the drive to manufacture automobiles which are more energy efficient, an increased number of metal surfaces in automobile engines are made of light weight aluminum. Examples of engine parts made of aluminum surfaces include cylinder heads, radiator cores and water pump housings and fittings. In the cooling system, aluminum corrosion products, particularly aluminum oxide, which circulate to and deposit on internal radiator surfaces, interfere with the heat transfer necessary to keep the engine from overheating. Aluminum surfaces are also particularly susceptible to localized pitting corrosion, which can perforate tubing. This corrosion problem is aggravated since engines have been designed to operate at higher temperatures. Overall, these and other factors have recently placed more stringent demands upon the performance of the aqueous glycol-based "antifreeze" compositions employed as engine coolants.

The automotive industry is also headed towards filling factory automobiles with extended life coolants so that the coolants need only be changed every 5 years and 100,000 to 150,000 miles. As a result, the demands placed upon coolants today require that the coolant have an extended life without depleting the corrosion inhibitor packages during service. While some conventional anti-freeze compositions adequately inhibit corrosion of metal surfaces, their corrosion inhibitor packages are consumed during service, requiring a change of the coolant at shorter intervals.

The corrosion inhibitor packages in conventional anti-freeze coolants typically comprise borates which function to protect solder and brass surfaces, and also function as act buffers; silicates for protecting cast iron and aluminum surfaces, and in particular cavitation of aluminum water pumps; primary and secondary amines, which in combination with phosphoric acids protect aluminum and cast iron surfaces; and phosphates to buffer the anti-freeze concentrate, preserve the pH of the concentrate, and protect steel, cast iron, and aluminum surfaces.

While each of these compounds provide a measure of protection and utility, each suffers drawbacks. For example, silicate compounds, known as an ingredient in antifreeze formulations which protect aluminum surfaces, are often thermally unstable and sensitive to pH, thereby reducing their shelf life. During service, silicate compounds also tend to gel in the presence of other salts in the formulation. Each of these drawbacks decrease the coolant's effectiveness against aluminum corrosion and deplete the content of active corrosion inhibiting silicates throughout the life of the coolant. Not only is the corrosion inhibiting life of silicates decreased, but the precipitates which form during service can also abrade metal surfaces.

Phosphates suffer the drawback in that they tend to combine with silicates to cause gelling problems. Further, phosphates increase the BOD or COD levels in rivers, lakes, and other bodies of water, tending to increase the levels of algae growth. Primary and secondary amines, while know for their ability to protect aluminum and cast iron when combined with phosphoric acids, tend to also combine with nitrites to form the toxic nitrosamines. In conventional fully formulated coolants, borates tend to corrode aluminum surfaces over time.

U.S. Pat. No. 4,851,145 describes the use of an alkylbenzoic acid such as the highly preferred p-tertbutyl benzoic acid in combination with $C_8$–$C_{12}$ aliphatic monobasic acids and hydrocarbyl triazoles as agents to protect against corrosion of metal surfaces as measured by a Rapid Cyclic Potentiokinetic Polarization Scanning technique. This and other publications, such as JP 59208082 and U.S. Pat. No. 5,489,391 and U.S. Pat. No. 2,832,742, recommend the use of p-tertbutylbenzoic acid. However, p-tertbutylbenzoic acid is toxic and is a suspected carcinogen. Its use in consumer anti-freeze applications is not favored. Further, we found that a p-tertbutylbenzoic acid containing formulation did not provide adequate resistance to corrosion of an aluminum coupon as measured in a potentiodynamic polarization test, while benzoic acid formulations exhibited a clear and sharp resistance to current flow as the potential was increased. These results and the benefits provided by benzoic acid over p-tertbutyl benzoic acid are described more fully below.

In U.S. Pat. No. 3,573,225, combinations of amine salts of fatty acids, alkali metal salts of benzoic acid, and alkanolamides have been proposed as corrosion inhibitors. Also, in DE 3,223,940, combinations of the salts of $C_6$–$C_{10}$ aliphatic carboxylic acids, salts of $C_6$–$C_{10}$ polyhydroxycarboxylic acids, and salts of aromatic monocarboxylic acids were proposed as corrosion inhibitors. While such salts of acids may provide suitable resistance against corrosion of many metal surfaces in fully formulated anti-freeze concentrates, we have found that many formulations containing salts of an unsubstituted aromatic carboxylic acids, such as sodium benzoates, were not effective to provide adequate protection against corrosion, particularly of iron and aluminum surfaces, in formulations free of borates, primary and secondary amines, phosphates, and silicates (BAPS free). It would be desirable to formulate an anti-freeze composition which provides adequate corrosion resistance without the need to add other corrosion inhibitors to the composition, such as the borates and silicates.

In coating applications unrelated to anti-freeze coolants for internal combustion engines, U.S. Pat. No. 4,342,596 discloses compositions containing $C_8$–$C_{20}$ aliphatic monocarboxylic acids, aminoalkylalkanolamines, aromatic carboxylic acids, and lubricant oils which are rolled or sprayed onto metal surfaces to protect them against oxidation during storage and provide a measure of lubrication. For purposes of the present invention, formulations containing lubricating oils or secondary amines are unsuitable for the desired anti-freeze application. Likewise, EP-20,042 discloses a coating composition applied onto metal surfaces to protect the surfaces against oxidation, provide lubrication, and which can be washed off prior to painting, which composition comprises 5–20 pbw of an aliphatic monobasic acid, optionally a lubricant, 10–35 pbw of an aromatic carboxylic acid, and an amine forming water soluble salt with the acid components. Similar compositions which are rolled, dipped, or sprayed onto metal surfaces and again washed off when the metal surface is ready to be painted or coated can be found in U.S. Pat. No. 3,573,225. Each of these compositions, however, are aqueous based compositions or alcohol based compositions, and each contain water soluble amine salts of the acids or primary or secondary amines.

Although stable and otherwise compatible inhibitor combinations have been developed, they are, in general, either unduly expensive, objectionable from the standpoint of toxicology and environmental concerns, unable to provide fully satisfactory multi-metal corrosion protection and pitting resistance, or characterized by unacceptable physical properties.

3. SUMMARY OF THE INVENTION

We have discovered an anti-freeze formulation which solves each of these problems. There is now provided an antifreeze concentrate comprising adding together:

a) an alkylene glycol;

b) an effective corrosion inhibiting amount, or more, of an unsubstituted benzoic acid; and c) an effective corrosion inhibiting amount, or more, of a $C_7$–$C_{14}$ monocarboxylic acid.

While the combination may be used in a variety of formulated anti-freeze coolants, this composition is particularly effective at inhibiting corrosion in formulations which are free of borates, primary and secondary amines, phosphates, silicates, and p-tertbutyl benzoic acid. Accordingly, in anther embodiment, there is provided an anti-freeze concentrate free borates, primary and secondary amines, phosphates, silicates, and p-tertbutyl benzoic acid, comprising adding together:

a) an alkylene glycol;

b) an effective corrosion inhibiting amount, or more, of an unsubstituted benzoic acid; and c) an effective corrosion inhibiting amount, or more, of a $C_7$–$C_{14}$ monocarboxylic acid.

In spite of the absence of silicates, which are known to protect aluminum surfaces, the absence of borates, which are known to protect brass surfaces, the absence of primary and secondary amines, the absence of phosphates, which are known to buffer the anti-freeze concentrate to preserve the pH of the concentrate, and the absence of toxic compounds such as p-tertbutyl benzoic acid, the anti-freeze concentrate of this invention is effective to inhibit the corrosion of aluminum, brass, solder, cast iron, copper, and steel surfaces, resists pitting, is storage stable by resisting gellation and sedimentation, and has a good refractive index freeze point.

In another embodiment, there is provided an anti-freeze concentrate free borates, nitrites, primary and secondary amines, phosphates, silicates, and p-tertbutyl benzoic acid, comprising adding together:

a) an alkylene glycol;

b) an effective corrosion inhibiting amount, or more, of an unsubstituted benzoic acid; and c) an effective corrosion inhibiting amount, or more, of a $C_7$–$C_{14}$ monocarboxylic acid.

4. BRIEF DESCRIPTION OF THE DRAWINGS

5. DETAILED DESCRIPTION OF THE INVENTION

Figure 1:
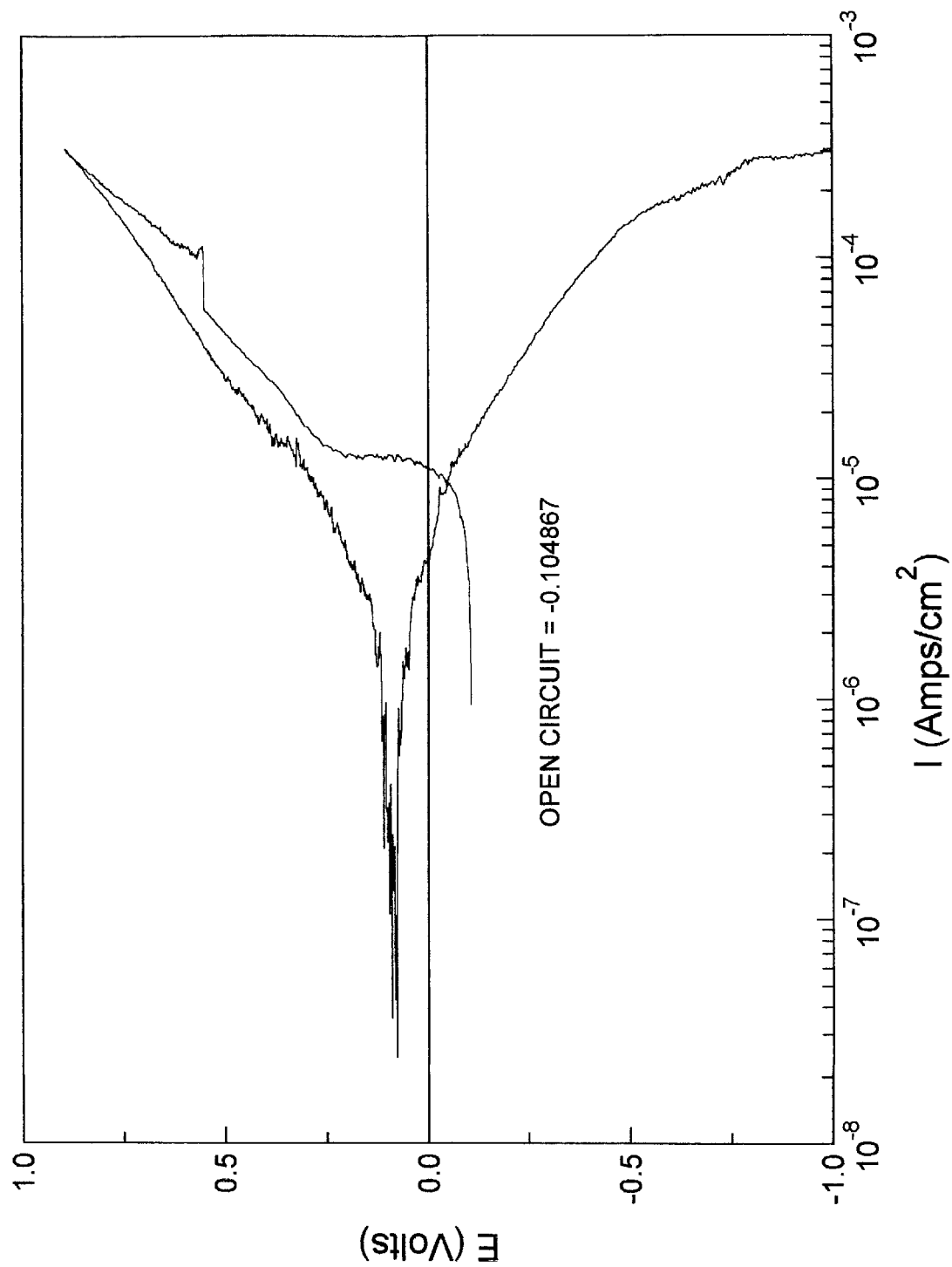
FIG. 1 represents the curve generated in a potentiodynamic polarization of a coolant formulation containing a combination of p-tertbutylbenzoic acid and 2-ethylhexanoic acid.

While the anti-freeze concentrate of the invention may be used in fully formulated coolants, its low cost and excellent corrosion inhibiting characteristics make the concentrate of the invention well suited for anti-freeze formulations which are free of the myriad of additives mentioned above, many of which are costly and have the performance disadvantages noted above. For convenience, those anti-freeze concentrate embodiments which are free of boron, primary and secondary amines, phosphates, and silicates may be referred to as a BAPS free formulation. In other embodiments of the invention, the anti-freeze concentrate may also be referred to as a BNAPS free anti-freeze concentrate, meaning that the formulation is free of boron, nitrites, primary or secondary amines, phosphates, and silicates. Within these embodiments, specific examples of typical types of compounds which are not in BAPS free anti-freeze concentrates, for illustration purposes, include borax, sodium metal metasilicate pentahydrate, alkali metal (sodium) phosphates and organophosphates, triethanolamine, and for a BNAPS free formulation, sodium nitrite. In other embodiments, compounds containing divalent metals (other than what may incidentally be found in hard water) are also preferably not added to the anti-freeze coolant of the invention since divalent metals may interact with acids and precipitate from solution. In other preferred embodiments, the anti-freeze concentrate is free of alkyl substituted benzoic acids, and in particular the toxic acid p-tertbutylbenzoic acid.

The alkylene glycol used in the concentrate of the invention is not limited. Alkylene glycols, as used herein, include the glycol ethers. Examples of the alkylene glycols include ethylene glycol, recycled ethylene glycol, propylene glycol, 1,3 butylene glycol, hexylene glycol, glycerin, diethylene glycol, dipropylene glycol, triethylene glycol, and mixtures thereof, with preference towards ethylene and propylene glycol, and especially ethylene glycol with at most 10 wt. % of diethylene glycol. Since the preferred application of the concentrate of the invention is for use as a coolant for internal combustion engines, the amount of alkylene glycol is preferably at least 50 wt. %, based on the weight of the anti-freeze concentrate, more preferably at least 80 wt. %, most preferably at least 90 wt. %.

The corrosion inhibitors include at least an unsubstituted benzoic acid and a $C_7$–$C_{14}$ monocarboxylic acid in amounts effective to inhibit corrosion. Formulations containing unsubstituted benzoic acid in the absence of the $C_7$–$C_{14}$ monocarboxylic acid, and formulations containing $C_7$–$C_{14}$ monocarboxylic acids in the absence of the unsubstituted benzoic acid, fail to effectively inhibit corrosion in a Glassware Corrosion test, and are also ineffective at resisting pitting as measured in a Ford Galvanostatic Pitting Test, described more in detail in the examples below. Further, the presence of only one of these compounds in the absence of the other also fails to prevent cavitation of aluminum water pumps under ASTM D-2809. We have also found that using a dicarboxylic acid in place of a mono-carboxylic acid in formulations containing benzoic acid, an apparently minor modification, did not provide adequate protection against corrosion of metal surfaces.

An amount effective to inhibit corrosion means that the amount should be sufficient to pass the Glassware Corrosion Test measured under ASTM D 1384, a Hot Surface Aluminum Test measured under ASTM D-4340, and the Refractive Index Freeze Point being –35° F. or lower as measured under ASTM D-l 177, each as measured within a pH range of 7.0 to 10.0. In general, suitable amounts of the unsubstituted benzoic acid are 0.5 wt. % or more based on the weight of the concentrate, more preferably 1.0 wt. % or more. Suitable amounts of monocarboxylic acid are generally 1.0 wt. % or more, more preferably 1.5 wt. % or more. In the absence of other acids present in a formulation, the coolant concentrate may become overly alkaline if the amount of the benzoic acid and the $C_7$–$C_{14}$ monocarboxylic acid drop too low. Merely backing out the amount of base added to an anti-freeze concentrate deficient in carboxylic acid concentration to attain a pH within the optimal pH range often may result in sacrificing other key performance criteria, such as refractive index freeze points.

The overall amount of unsubstituted benzoic acid and $C_7$–$C_{14}$ monocarboxylic acid in the anti-freeze concentrate desirably ranges from 2.0 wt. % to 6.0 wt. %. Optimal total amounts of the unsubstituted benzoic acid and the $C_7$–$C_{14}$ monocarboxylic acid which balance performance with formulation costs range from 3 wt. % to 5 wt. %.

Molar ratios of $C_7$–$C_{14}$ monocarboxylic acid to unsubstituted benzoic acid that are particularly effective at inhibiting corrosion and pitting are 1:1. Molar ratios of $C_7$–$C_{14}$ monocarboxylic acid to the unsubstituted benzoic acid greater than 0.5:1 impart adequate Glassware Corrosion resistance. In many formulations within the scope of the invention, molar ratios of $C_7$–$C_{14}$ monocarboxylic acid to the unsubstituted benzoic acid at 0.8:1 or greater, or 1:1 or greater, and optimally about 1.1:1 or greater, provide excellent resistance to corrosion as measured by under the Glassware Corrosion test.

In a particular embodiment employing 2-ethylhexanoic acid as the $C_7$–$C_{14}$ monocarboxylic acid, weight ratios of 2-ethylhexanoic acid to the unsubstituted benzoic acid of about 1:1 or greater have been found to impart excellent Glassware Corrosion resistance, good RI values, and good resistance to pitting. Weight ratios of the 2-ethylhexanoic acid to unsubstituted benzoic acid ranging from 1.25–2:1 are especially preferred.

The amount of stated unsubstituted benzoic acid in the anti-freeze concentrate is determined by the amount of calculated unsubstituted benzoic acid contained in the concentrate in its free acid state. In other words, the anti-freeze concentrate should not contain such a large stoichiometric excess of alkali metal or alkaline earth metal cations that the concentration of free unsubstituted benzoic acid drops below the minimum levels stated above. While salts of benzoic acid, such as sodium or potassium benzoate, may be added to the anti-freeze concentrate, the addition of these alkali metal benzoate salts cannot replace the addition to the concentrate of unsubstituted benzoic acid as a free acid. Without being bound to a theory, it is believed that the benzoic acid anion either forms a passivation layer on metal surfaces or structurally alters the metal surface, especially aluminum surfaces. The presence of sufficient alkali metal cations which preferentially bond ionically to the benzoate anion over other anions may inhibit the ability of the unsubstituted benzoic acid to passivate or alter metal surfaces.

Suitable $C_7$–$C_{14}$ monocarboxylic acids are hexanoic acid, heptanoic acid, octanoic acid, 2-ethylhexanoic acid, decanoic acid, undecanoic acid, dodecanoic acid, and heptanoic acid. The preferred acid is octanoic acid, and 2-ethylhexanoic acid is especially preferred.

The pH of the composition of the invention, whether an antifreeze concentrate or a diluted service solution, should be controlled to enhance corrosion protection. The anti-freeze concentrate should have a pH in the range from about 7 to 10, measured, for example, on a sample diluted with 100 to 900 parts by volume water per 100 parts by volume of antifreeze and determined with a standardized pH meter according to ASTM method D 1287. A pH between about 7 and 9.5 is preferred, while a pH between about 7 and 9.0 is most preferred. To provide the desired pH level, it is generally necessary to add to the composition any of the alkali known to be suitable for antifreeze services, preferably one or a mixture of the alkali metal hydroxides, more preferably sodium or potassium hydroxide, and most preferably sodium hydroxide in a quantity, for instance, of about 0.1 to 4 wt. % based on 100 pbw of the glycol.

The anti-freeze concentrate preferably contains less than 250 ppm of silicon atoms in order to satisfy ASTM D-4985 requirements imposed upon anti-freeze concentrates for use in heavy duty applications.

The anti-freeze coolant concentrate of the invention is also storage stable and mono-phasic. In shelf life tests of 30 days at 65° C., the composition remains mono-phasic with no sedimentation or phase separation detectable to the naked eye.

Other ingredients that can be added to the anti-freeze concentrate include alkali metal hydroxides, nitrates, nitrites, antifoamers such as non-ionic surfactants, bitters, dyestuffs, other types of carboxylic acids, and an aromatic triazole or the salt thereof. The amount of any optional ingredient added should not exceed a point where the anti-freeze concentrate fails any one of the ASTM tests for analyzing the RI, HSAT, or Glassware Corrosion, or where the pH exceeds 10.0.

The anti-freeze concentrate may optionally contain nitrites. In heavy duty applications, such as diesel and tractor engines, the BAPS free anti-freeze concentrate may contain nitrites to provide wet sleeve liner protection against pitting. Since all the formulations of the invention are free of amines, the formation of nitrosoamines is avoided. In light duty formulations, the preferred anti-freeze concentrate is BNAPS free, especially since nitrites can contribute to cavitation of aluminum water pumps found in light duty applications. The amount of nitrites added is about 7,500 ppm or less, or from 1.0 wt. % or less.

Examples of other acids that can be added in combination with the $C_7$–$C_{14}$ monocarboxylic acid and the unsubstituted benzoic acid include dibasic and tribasic acids such as sebacic acid, suberic acid, azelaic acid, dodecanedioic acid, terephthalic acid, the diacid of dicylcopentadiene, benzenetricarboxylic acid, oxoisophthalic acid, pyromellitic acid, trimesic acid, trimellitic acid, and citric acid. In some cases, and depending upon the quantity of acid added, these other acids may degrade the performance of the anti-freeze concentrate against corrosion, pitting, or water pump cavitation. The preferred anti-freeze concentrate, however, is free of di or higher carboxylic acids.

Nitrates are optional in the anti-freeze concentrate of the invention. In preferred embodiments, the anti-freeze concentrate is also free of nitrates as their presence is not necessary to attain the desired corrosion and pitting inhibiting effects within the desired pH range and the refractive index freeze points. However, suitable nitrates which can be included are the alkali metal nitrates, typically in amounts of 0.5 wt. % or less based on the weight of the anti-freeze concentrate. Examples are sodium and potassium nitrates.

Antifoam agents are desired. Suitable antifoam agents include non-silicate silicone emulsions, polyglycols, and preferably non-ionic surfactants.

Triazoles or thiazloes are desired to protect against corrosion of brass and copper. Examples of suitable triazoles and thiazoles include tolyltriazole, benzotriazole, and sodium mercaptobenzothiazole, and the alkali metal salts thereof, such as sodium or potassium. Suitable amounts of the triazoles and thiazoles range from 0.07 to 0.5, based on 100 pbw of the glycol.

To the anti-freeze concentrate may optionally be added water. For reasons relating to convenience in handling and storage, the antifreeze may be formulated as a concentrate containing little or no water. Typically, such concentrates contain between about 0.1 and 10 parts by weight of water per 100 parts by weight of glycol, while a water content of between about 1 and 5 parts by weight per 100 parts by weight of glycol is particularly preferred. The invention is, however, intended to encompass both such concentrates and dilutions made with water for use in the automotive cooling system and other heat transfer services. For the typical service, the concentrate is diluted to a solution containing up to about 400 parts by weight of water per 100 parts by weight of glycol, preferably about 40 to 200 parts by weight of water per 100 parts by weight of glycol, and most preferably about 65 to 150 parts by weight of water per 100 parts by weight of glycol. The relative amount of water and glycol in such service solutions is, of course, varied to provide the desired combination of heat transfer, freezing point and boiling point properties, and corrosion protection.

To the anti-freeze concentrate may be added supplemental coolant additives. These additives, such as nitrites, borates, phosphates, are typically used in heavy duty applications where fully formulated coolant ingredients are depleted over the service life. The supplemental coolant additives are typically added every 15,000 to 20,000 miles to coolants on a periodic basis to avoid changing out the coolant or using more coolants. However, one of the advantages of the invention is avoiding the need to add supplemental coolant additives since the anti-freeze concentrate of the invention is designed for use in formulations which are already BAPS or BNAPS free.

To the anti-freeze may also be added coolant extenders designed for use with organic acid based coolant. These extenders usually contain nitrites and a triazole such as tolyltriazole. There exists a belief by some that nitrites and tolyltriazole may be consumed in service, and accordingly, extenders for use in organic acid based coolants may be added once or twice during the service life of the coolant to ensure that the level of these ingredients remains constant.

Due to the simplicity of the anti-freeze concentrate of the invention, it is cost effective relative to other anti-freeze concentrates containing the host of conventional additives. Further, the simplicity of the anti-freeze concentrate of the invention makes processing and handling easier as well.

The following examples illustrate some of the specific embodiments encompassed within the scope of the invention:

An primary or secondary amine free anti-freeze concentrate comprising:
a) an alkylene glycol;
b) an effective corrosion inhibiting amount, or more, of an unsubstituted benzoic acid, optionally and preferably in an amount of 0.75 wt. % or more; and
c) an effective corrosion inhibiting amount, or more, of a $C_7$–$C_{14}$ monocarboxylic acid, optionally and preferably in an amount of 1.0 wt. % or more.

This anti-freeze concentrate is also optionally and preferably BAPS free, more preferably free of t-butylbenzoic acid, and most preferably contains less than 1.0 wt. % or di- or higher carboxylic acids.

Another embodiment comprises a BNAPS free anti-freeze concentrate containing at least:
a) an alkylene glycol;
b) an effective corrosion inhibiting amount, or more, of an unsubstituted benzoic acid, optionally and preferably in an amount of 0.75 wt. % or more; and
c) an effective corrosion inhibiting amount, or more, of a $C_7$–$C_{14}$ monocarboxylic acid, optionally and preferably in an amount of 1.0 wt. % or more.

This anti-freeze concentrate is also preferably free of t-butylbenzoic acid, and preferably contains less than 1.0 wt. % of di- or higher carboxylic acids.

In each of these embodiments, the anti-freeze concentrate passes the Glassware Corrosion Test measured under ASTM D 1384, the Hot Surface Aluminum Test measured under ASTM D-4340, and have a Refractive Index Freeze Point being −35° F. or lower as measured under ASTM D-1177, when measured within a pH range of 7.0 to 10.0. The anti-freeze concentrates of the invention and in each of these embodiments are also resistant to pitting as measured by the Ford Galvanostatic Pitting Test described below.

Further non-limiting examples which illustration the invention are set forth below.

EXAMPLES

Example 1

The protection provided by the formulation against corrosion of various metals was evaluated in the standard Glassware Corrosion Test ASTM D 1384. Results of the performance of the antifreeze concentrate are presented in Table I. Entries in the table are in terms of milligrams per square inch of metal surface lost during a 14 day test at 88° C., and represent an average of three test specimens and evaluations. The maximum acceptable corrosion levels in the Glassware Corrosion test are Cu: ≦10; Solder: ≦30; Brass: ≦10; Steel: ≦10; Cast Iron: ≦10; Cast Aluminum: ≦30 mg.

A 25% volume dilution of the antifreeze concentrate in water was evaluated in a "hot surface aluminum" corrosion test for evaluating the anti-freeze performance against corrosion of aluminum at elevated temperature under ASTM D-4340. The corrosion of aluminum coupon surfaces in the 25% volume solution of the concentrate in water was determined in a 7 day test at 135° C., reported as $mg/cm^2/wk$. The maximum acceptable corrosion in the hot surface aluminum test is 1.0 milligrams per square centimeter.

The pH of each sample was analyzed according to ASTM D-1287, and measured in 50 volume % distilled water. The Refractive Index Freeze Point of each sample was analyzed according to ASTM D-1 177 at 50% volume in distilled water, reported as °F. A pass rating is −34° F. or lower. The aluminum water pump cavitation test was performed according to ASTM D-2809-94. A rating of at least 8 at 100 hours must be attained to pass this test.

Each sample was blended according to the following procedure. Under continuous agitation, ethylene glycol was heated to 120–130° F., and maintained throughout the blending operation. The following components were blended until fully dissolved. Once dissolved, the heat was turned off, and agitation was continued until the solution reached room temperature. The amounts of each ingredient are reported in Table I below as weight percent, and the evaluation results are reported in Table 2. In each table below, P means pass and F means fail.

TABLE 1

| Sample | 1 | 2* | 3 | 4 | 5 | 6 | 7 | 8 | 9 | 10 | 11 | 12 |
|---|---|---|---|---|---|---|---|---|---|---|---|---|
| EG | 93.55 | 95.4 | 93.118 | 94.214 | 88.567 | 93.87 | 93.005 | 93.401 | 93.20 | 93.26 | 92.62 | 93.50 |
| $Na_2B_4O_7.5H_2O$ | | | | | | | | 1.499 | | | | |
| NaOH(50% aqueous) | 2.364 | 57 ppm | 2.819 | 1.193 | 2.472 + 1.181** | 2.03 | 1.900 | 0.899 | 2.64 | 2.67 | 2.81 | 2.39 |
| Benzoic Acid | 1.488 | | 2.469 | 0.174 | | | | | 3.05 | 1.31 | 1.48 | |
| P-tertbutyl Benzoic Acid | | | | | | | | | | | | 1.495 |
| 2-Ethylhexanoic Acid | 2.48 | 3.8 | | 0.174 | | 3.95 | | 0.999 | | 1.31 | 2.49 | 2.49 |
| Adipic Acid | | | | 0.940 | 4.449 | | | | | | | |
| Sebacic Acid | | 0.6 | 1.481 | | | | 4.780 | | | 1.31 | 0.5 | |
| Imidazole Sodium Benzoate | | | | | 1.977 | | | 1.998 | | | | |
| Silicate Stabilizer A | | | | | 0.247 | | | | | | | |
| Silicate Stabilizer B | | | | | | | | | | | | |
| Sodium Nitrate | | | | | 0.247 | | | 0.250 | | | | |
| Sodium Molybdate Dihydrate | | | | | 0.099 | | | 0.200 | | | | |
| Sodium Nitrite | | | | 1.052 | | | | | | | | |
| Benzotriazole | | | | | | | | 0.130 | | | | |
| Water | | | | 2.007 | 0.241 | | | 0.372 | | | | |
| Surfactant[1] | 0.015 | 0.015 | 0.015 | 0.015 | 0.020 | 0.015 | 0.015 | 0.025 | 0.015 | 0.014 | 0.014 | 0.014 |
| Silicate Stabilizer C | | | | | 0.0536 | | | 0.049 | | | | |
| Sodium Tolyltriazole | 0.099 | 0.2 | 0.099 | 0.231 | 0.248 | 0.099 | 0.250 | | 0.099 | 0.099 | 0.099 | 0.099 |
| $Na_2SiO_3.5H_2O$ | | | | | 0.174 | | | 0.179 | | | | |
| KOH | | 1.1 | | | | | | | | | | |
| NaMBT | | 0.01 | | | | | | | | | | |

[1] A polyoxypropylene-polyoxyethylene glycol block copolymer, used as an antifoam agent.
*The formulation in this example is taken from a commercially available antifreeze coolant analyzed by liquid chromatography.
**93% solid NaOH.

TABLE 2

| | | | | Glassware Corrosion | | | | | | |
|---|---|---|---|---|---|---|---|---|---|---|
| Sample | pH | RI | HSAT | Cu | Solder | Brass | Steel | Cast Fe | Cast Al | Stability |
| 1 | 8.5 | −38 | 0.0159P | 1P | 2P | 2P | 2P | 1P | 10P | Colorless, Clear |
| 2 | 8.8 | — | 0 | 0P | 1P | 0P | 0P | 0P | 10P | — |
| 3 | 7.7 | −46 | −0.0265P | 1P | 8P | 1P | 1P | 262F | 56F | Slightly Yellow |
| 4 | 8.5 | −30F | 0 | 0P | 1P | 0P | 0P | 0P | 8P | Sedimentation |
| 5 | 7.4 | −40 | 0.28 | 57F | 6P | 10P | 3P | 15F | 2P | Colorless |
| 6 | 8.17 | −38 | 0.1007 | 1P | 6P | 1P | 23F | 80F | 55F | Clear |
| 7 | 7.81 | −44 | 0.255 | 1P | 1P | 1P | 0P | 1P | 3P | Clear |
| 8 | 8.1 | −40 | 0.27 | 0P | −1P | −1P | −1P | −2P | −8P | Clear |
| 9 | 7.65 | −41 | 0.0228 | 1P | 1P | 1P | 33F | 377F | 28P | Clear |
| 10 | 7.4 | −37 | 0.0811 | 1P | 5P | 1P | 22F | 32F | 62F | Brown Particles |
| 11 | 8.39 | −38 | −0.1204 | 1P | 11P | 1P | 19F | 57F | 60F | Few Brown Particles |

A comparison of Sample 1, the combined use of benzoic acid with 2-ethylhexanoic acid, with Sample 6, employing only 2-ethylhexanoic acid, indicates that an aliphatic monocarboxylic acid alone is insufficient to provide adequate protection against corrosion of steel, cast iron, and cast aluminum. Likewise, the formulation of Sample 9, employing only benzoic acid as the acid, provided insufficient protection against corrosion of steel and cast iron surfaces. However, the combination of benzoic acid and 2-ethylhexanoic acid provided good protection against corrosion of all metal surfaces tested.

The formulation of Sample 3, a combination of benzoic acid and the aliphatic dicarboxylic acid sebacic acid, also failed to adequately protect cast iron and cast aluminum surfaces against corrosion in these tests. In contrast, when the monocarboxylic acid, 2-ethylhexanoic acid, was added to benzoic acid as in Sample 1, the metal surfaces tested were protected against corrosion. A comparison of Sample 10 and 11 with Sample 1 indicates that the presence of certain quantities of sebacic acid, in combination with otherwise suitable quantities of benzoic acid and 2-ethylhexanoic acid, detrimentally affected the performance of the coolant formulation against corrosion of steel, cast iron, and cast aluminum surfaces. However, as shown in Sample 7, a BNAPS free formulation containing sebacic acid as the sole acid provided good corrosion resistance according to the Glassware Corrosion tests. In view of these results, it was surprising to find that sebacic acid, in combination with benzoic acid and 2-ethylhexanoic acid and in sufficient amounts, deteriorated the corrosion resistance of the coolant concentrate. Accordingly, in a preferred embodiment of the invention, the anti-freeze-freeze formulation is essentially free of sebacic acid.

Samples 3 and 5 also demonstrate that sebacic acid or adipic acid, both dicarboxylic acids, in combination with either benzoic acid or sodium benzoate, respectively, was insufficient to adequately protect the metal surfaces tested, even when formulated with silicates as in Sample 5. Rather, it was the combination of benzoic acid and 2-ethylhexanoic acid as in Example 1 which provided sufficient corrosion resistance, even in the absence of silicates, borates, primary or secondary amines, and phosphates.

The formulation of Sample 4 was also insufficient to provide adequate properties. In particular, the combination of benzoic acid and 2-ethylhexanoic acid were not present in amounts effective to provide the formulation with an adequate refractive index freeze point, even though the concentrate adequately protected the surface of the metals tested.

Potentiodynamic Polarization Tests On Samples 1 and 12

Figure 2:
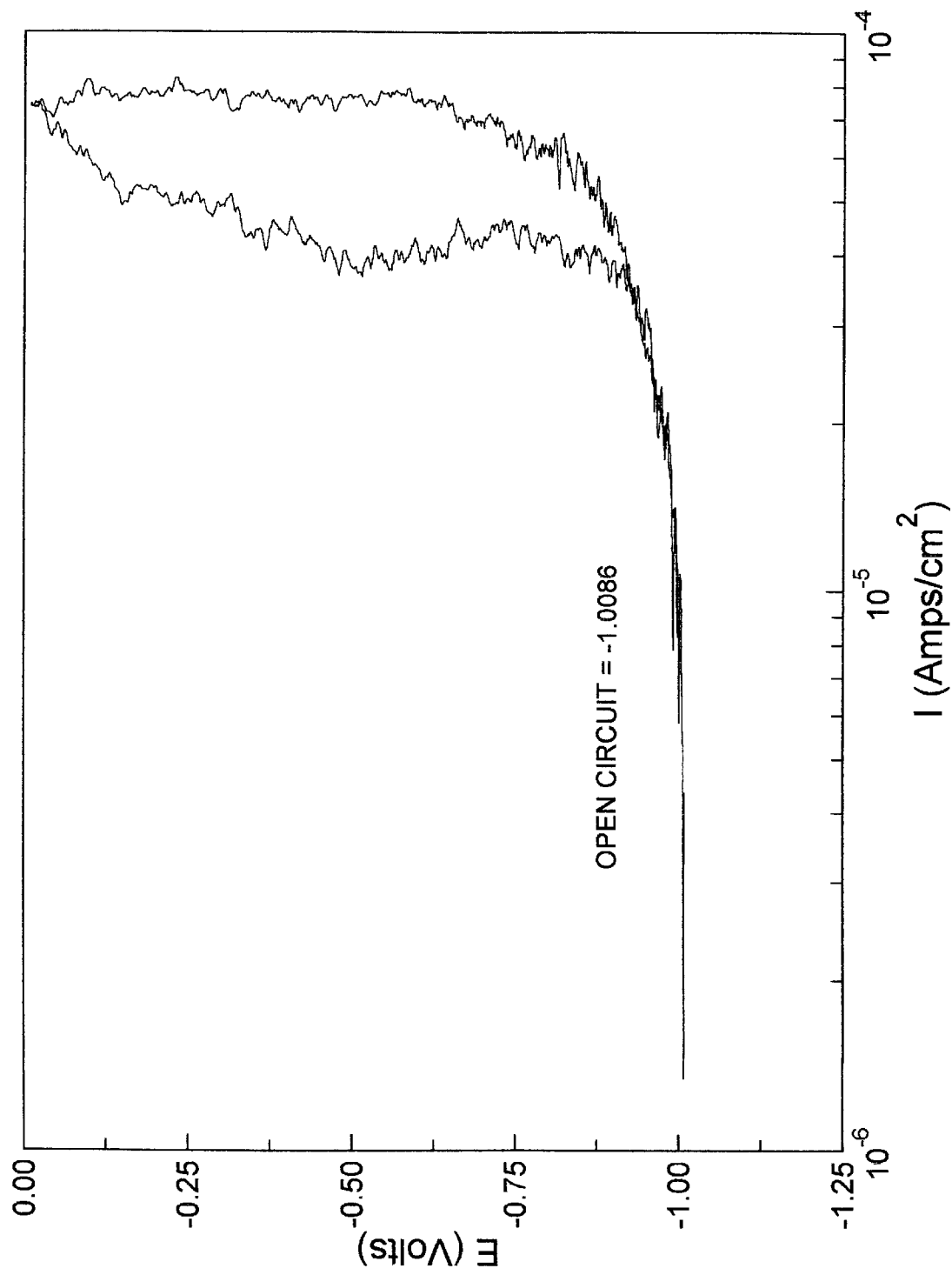
FIG. 2 represents the curve generated in a potentiodynamic polarization of a coolant formulation within the invention containing benzoic acid instead of p-tertbutylbenzoic acid.

The results of the potentiodynamic polarization tests conducted on Samples 1 and 12 are set forth in FIGS. 2 and 1 respectively. This test is used to predict the ability of an anti-freeze formulation to passivate a metal surface or otherwise protect it from corrosive pitting due to the formation of localized galvanic cells in service conditions. The test was conducted as follows:

The method used a glass water jacketed electrochemical cell. The experiment was run using a computer controlled Solatron SI 1287 potentiostat, and CorrWare for Windows electrochemical/corrosion software was used to input parameters and view resulting scans.

Aluminum coupons were washed, rinsed with deionized water followed by acetone rinse, and allowed to dry. All surfaces were polished with an electric white drafting eraser, placed in a beaker of acetone, ultrasonically cleaned for 2 minutes, and then rinsed immediately before use.

The electrochemical cell was set up by placing 900 ml of a 25% coolant solution made with ASTM 1384 corrosive water into a jacketed corrosion cell. About 10 mm of air was pumped through a sparger placed in the solution. The thermometer was mounted, and the water bath surrounding the cell was heated to get the solution to a temperature of about 88° C. inside the cell.

The coupons were attached to a specimen holder as the working electrode, which was positioned in the center tube of the cell. To the reference electrode bridge tube was attached a VYCOR tip. The bridge tube and the reference electrode were filled with 4 molar potassium chloride. The reference electrode was inserted into the bridge tube such that the bottom of the electrode contacted the solution in the bridge tube. This assembly was then loosely mounted to a ball and socket joint and clamp, and the bridge tube was adjusted to the VYCOR tip was positioned to within 1 mm of the specimen surface. The two counter electrodes were mounted on the cell, the leads from the potentiostat were connected to the electrodes, and the counter electrodes were connected to each other by alligator clips.

The open circuit potential was run until a steady potential was reached. The potentiodynamic scan was started at the open circuit utilizing a +/- mV range at a 1 mV/sec scan rate.

FIG. 1 shows that as the potential was increased through about 1 volt from baseline, the amperage continued to rise through the aluminum coupon in the Sample 12 formulation solution containing t-butylbenzoic acid/2-ethylhexanoic acid as the corrosion inhibitor. At best, Sample 12 was able to resist, if at all, a rise in amperage over only a very short increase in potential (about 0.2 volts), after which there was a rapid increase in current flow across the aluminum coupon which continued throughout the remainder of the voltage rise. This result indicates that this formulation would not be an effective formulation to form a passivation layer resisting pitting of aluminum surfaces which frequently occurs when a localized galvanic cell is formed in service. Further, the short flatline in the curve at about $10^{-4}$ amps without any rise in the voltage levels indicates a high probability of pitting action at that potential.

By contrast, the sharp rise in the curve of FIG. 2 corresponding to Sample 1 containing benzoic acid/2-ethylhexanoic acid as the corrosion inhibitor shows that as the potential was increased by about 1 volt from baseline, there was no substantial corresponding rise in amperage. This indicates that Sample 1 passivated the aluminum coupon or otherwise protected the aluminum surface against the flow of a current as the voltage rose. Accordingly, Sample 1 would be expected to provide good resistance to pitting aluminum surfaces in the event a localized galvanic cell is formed in service conditions. Further, the current flow across the coupon in Sample 1 was less at the 1 volt end point potential than the current flow across the coupon in Sample 12 at the 1 volt end point potential, indicating that aluminum surfaces contacting Sample 1 coolant have a greater degree of resistance against pitting action due to galvanic cell formation than coolants corresponding to Sample 12 containing t-butylbenzoic acid in place of benzoic acid.

Example 2

Further testing of Samples 1,2, 7 and 8 were conducted to analyze their resistance to water pump cavitation under ASTM D-2809-94 and pitting under the Ford Galvanostatic Pitting Test. The results of only these four formulations are reported since the other formulation examples above failed to pass the RI or Glassware Corrosion standards.

To pass the Ford Galvanostatic Pitting Test, the potential of the sample must measure more positive than 400 mV vs SCE. The test was conducted in accordance with the procedures set forth in R. R. Wiggle, et al., "A Rapid Method to Predict the Effectiveness of Inhibited Engine Coolants in Aluminum Heat Exchangers," Paper 800800, 1980 Society of Automotive Engineers, Inc. The test samples were mixed with 18 Megohm deionized water and ASTM corrosive water concentrate to give 100 ppm levels of chloride, sulfate, and carbonate in a final coolant concentration of 25% by volume. Oxygen was removed by sparge, and the aluminum test specimens were taken from 7072 clad 3003 aluminum stock plate, polished to 600 grit. The specimens were tested at a constant current of 100 $\mu$A/cm$^2$ for over one hour using a EG&G Princeton Model 273 Potentiostat/Galvanostat. The reference electrode was a saturated calomel electrode (SCE).

The reported result below is the pitting potential taken at the most active potential following the initial potential spike for the sample.

TABLE 3

| Sample | Pump Cavitation | Ford Pitting |
|---|---|---|
| 1 | 8P | −320P |
| 2 | 3F | −560F |
| 7 | 6F | +530P |
| 8 | 6F | +100P |

ASTM D2809-89 specifies a rating of 8 as "Light erosion may be generalized on working surfaces. Dimensional change not to exceed 0.4 mm (1/64 inch)." A rating of 6 is specified as, "Erosion with dimensional change not to exceed 0.8 mm. Depressions, grooves, clusters of pits, or scalloping, or both, within 0.8 mm dimensional change limit permitted." A rating of 3 is specified as, "Erosion with dimensional change not to exceed 2.4 mm. Depressions, grooves, clusters of pits or scalloping, or both, permitted." The ratings were assigned by taking measurements through visual observation of erosion.

These results of Table 3 indicate that inventive Sample 1 formula provides both excellent resistance to cavitation of aluminum surfaces in a dynamic water pump test and resistance to electrochemical pitting of aluminum surfaces. At a minimum, the anti-freeze coolant formulation should provide adequate resistance to pitting of aluminum surfaces according to the Ford Pitting test protocol. However, the scope of the invention also includes some embodiments which when formulated in optimized amounts using the ingredients as in Sample 1, can also provide further enhancements to corrosion resistance as measured by passing the water pump cavitation test. In applications where cavitation of aluminum water pumps is a concern, such as light duty applications containing older versions of aluminum water pumps which are less resistant to cavitation than newer models of water pumps, this formulation would be particularly useful. However, the scope of the invention also includes those coolant formulations containing combinations of benzoic acid/2-ethylhexanoic acid which do not pass this particularly rigorous ASTM D-2809-94 standard, but which avoid pitting according to the Ford Pitting Test.

The results of Table 3 indicate that formulation Example 2 containing a combination of 2-ethylhexanoic acid and sebacic acid, failed both the Ford Pitting test and the ASTM D-2809-94 water pump cavitation test. Examples 7 and 8 each passed the Ford Pitting test. However, sample 8 was fully formulated with borates and silicates, and sample 7 contained large amounts of the costly sebacic acid. Further, Sample 1 has the additional advantage of providing added corrosion resistance to water pump cavitation which both Samples 7 and 8 failed.

Example 3

In this example, the effect of the relative amounts of 2-ethylhexanoic acid and benzoic acid on their Glassware Corrosion resistance, HSAT corrosion resistance, as well as their RI freeze points under the above mentioned ASTM methods were tested. The Formulations are set forth in Table 4, and the results are reported in Table 5.

TABLE 4

| Sample | 13 | 14 | 15 | 16 | 17 |
|---|---|---|---|---|---|
| Ethylene Glycol | 93.56 | 93.53 | 93.45 | 93.41 | 93.37 |
| Sodium Hydroxide (50% aqueous) | 2.35 | 2.38 | 2.46 | 2.51 | 2.54 |
| Benzoic Acid | 0.39 | 0.99 | 1.98 | 2.47 | 2.97 |
| 2-Ethylhexanoic Acid | 3.57 | 2.97 | 1.98 | 1.48 | 0.99 |
| Surfactant[1] | 0.014 | 0.014 | 0.014 | 0.014 | 0.014 |
| Sodium Tolyltriazole | 0.099 | 0.099 | 0.099 | 0.099 | 0.099 |

[1]A polyoxypropylene-polyoxyethylene glycol block copolymer, used as an antifoam agent.

TABLE 5

| | | | | Corrosion Resistance | | | | | |
|---|---|---|---|---|---|---|---|---|---|
| Sample | pH | RI | HSAT | Cu | Solder | Brass | Steel | Cast Iron | Cast Aluminum |
| 13 | 7.9 | −40 | −0.07 | 2 | 3 | 1 | 1 | 1 | 6 |
| 14 | 8.12 | −42 | 0.92 | 1 | 3 | 1 | 1 | 1 | 10 |
| 15 | 8.14 | −39 | 0.0053 | 1 | 3 | 1 | 1 | 6 | 13 |
| 16 | 8.35 | −42 | — | 0 | 2 | 1 | 0 | 46F | 16 |
| 17 | 9.02 | −40 | 0.26 | 0 | 5 | 1 | 8 | 207F | 37F |

Samples 13–15 passed each of the test conditions. Based on the results of samples 16–17 however, in a BNAPS free environment, the relative amount of 2-ethylhexanoic acid to benzoic acid affects the resistance to corrosion as measured in these tests. Example 16, which represents a BNAPS free coolant formulation containing a molar ratio of 2-ethylhexanoic acid to benzoic acid of about 0.5: 1, does not contain a sufficient amount of 2-ethylhexanoic acid relative to benzoic acid to impart the needed corrosion resistance. The particular ratio of 2-ethylhexanoic acid to benzoic acid can be optimized depending upon the type and amount of other ingredients in the coolant formulation, such as the addition of nitrites, or other acids such as dicarboxylic acids and/or additional monocarboxylic acids. In one embodiment, however, the molar amount of 2-ethylhexanoic acid to benzoic acid is preferably greater than 0.5: 1, more preferably 0.65:1 or greater, even 0.8:1 or greater, and most preferably about 1:1 or greater.

What we claim is:

1. An antifreeze concentrate which is free of borates, primary and secordary amines, phosphates and silicates comprising:
   a) an alkylene glycol;
   b) at least 0.75 wt. % of an unsubstituted benzoic acid; and
   c) an effective corrosion inhibiting amount, or more, of a $C_7$–$C_{14}$ monocarboxylic acid.

2. The antifreeze concentrate of claim 1, wherein said concentrate is free of p-tertbutyl benzoic acid.

3. The antifreeze concentrate of claim 2, wherein said concentrate is free of nitrites.

4. The antifreeze concentrate of claim 1, wherein said monocarboxylic acid comprises octanoic acid.

5. The antifreeze concentrate of claim 4, wherein said monocarboxylic acid comprises 2-ethylhexanoic acid.

6. The antifreeze concentrate of claim 1, wherein the total amount of benzoic acid and monocarboxylic acid added together ranges from 2 wt. % to 6 wt. %, based on the weight of the antifreeze concentrate.

7. The antifreeze concentrate of claim 1, wherein the pH of said concentrate ranges from 7.0 to 9.5.

8. The antifreeze concentrate of claim 1, wherein the dynamic pump cavitation rating of said concentrate subjected to and tested under ASTM 2809 conditions is 8 or greater.

9. The antifreeze concentrate of claim 1, wherein said concentrate has an RI of less than −35° F. when subjected to and tested under ASTM D-1177 conditions.

10. The antifreeze concentrate of claim 9, wherein said concentrate passes the Glassware Corrosion rating, when subjected to and tested under ASTM D-1384 at ATI standard conditions.

11. The antifreeze concentrate of claim 10, wherein said concentrate has the following Glassware Corrosion rating, when subjected to and tested under ASTM D-1384 at standard conditions:
   a) less than 5 mg copper loss;
   b) less than 5 mg solder loss;
   c) less than 5 mg brass loss;
   d) less than 5 mg steel loss;
   e) less than 5 mg cast iron loss;
   f) less than 15 mg cast aluminum loss.

12. The antifreeze concentrate of claim 10, wherein said concentrate has an HSAT rating of less than 0.2 $mg/cm^2/wk$ when subjected to and tested under ASTM D-4340 conditions.

13. The antifreeze concentrate of claim 10, wherein said concentrate is Shelf Stable without visible particle formation by naked eye.

14. The antifreeze concentrate of claim 1, comprising:
   a) 90 wt. % or more of ethylene glycol, recycled ethylene glycol, or propylene glycol;
   b) from 0.75 wt. % to 2 wt. % of benzoic acid;
   c) from 1.5 wt. % to 3 wt. % of octanoic acid;
wherein the molar ratio of c) to b) is greater than 0.5:1.

15. The antifreeze concentrate of claim 1, wherein the weight ratio of monocarboxylic acid to benzoic acid ranges from 1.1:1 to 3:1.

16. The antifreeze concentrate of claim 1, further comprising an alkali metal hydroxide, a non-ionic surfactant, and an aromatic triazole or the salt thereof.

17. The antifreeze concentrate of claim 1, wherein the concentrate consists essentially of ethylene glycol, benzoic acid, the monocarboxylic acid, an alkali metal hydroxide, a non-ionic surfactant, and an aromatic triazole or the salt thereof.

18. The antifreeze concentrate of claim 1, wherein the molar ratio of c) to b) is greater than 0.5:1.

19. The antifreeze concentrate of claim 1, wherein the molar ratio of c) to b) is 0.65:1 or greater.

20. The antifreeze concentrate of claim 1, wherein the molar ratio of c) to b) is 0.8:1 or greater.

21. The antifreeze concentrate of claim 1, wherein the molar ratio of c) to b) is 1:1 or greater.

22. The antifreeze concentrate of claim 1, wherein the amount of the $C_7$–$C_{14}$ monocarboxylic acid is 1.0 wt. % or more, based on the weight of the concentrate.

23. The process of claim 22, wherein the amount of benzoic acid is 1.0 wt. % or more, and the amount of the $C_7$–$C_{14}$ monocarboxylic acid is 1.5 wt. % or more, each based on the weight of the concentrate.

24. The process of claim 23, comprising 90 wt. % or more of ethylene glycol, based on the weight of the concentrate, and said monocarboxylic acid comprises an octanoic acid.

25. A process for inhibiting corrosion of the metals present in the cooling system of an internal combustion engine, comprising adding to said cooling system an antifreeze composition which is free of borates, primary and secondary amines, phosphates and silicates comprising:
   a) an alkylene glycol;
   b) at least 0.75 wt. % of an unsubstituted benzoic acid; and
   c) an effective corrosion inhibiting amount, or more, of a $C_7$–$C_{14}$ monocarboxylic acid.

26. The process of claim 25, wherein said concentrate is free of p-tertbutyl benzoic acid.

27. The process of claim 25, wherein said concentrate is free of nitrites.

28. The process of claim 25, wherein said monocarboxylic acid comprises octanoic acid.

29. The process of claim 28, wherein said monocarboxylic acid comprises 2-ethylhexanoic acid.

30. The process of claim 25, wherein the total amount of benzoic acid and monocarboxylic acid added together ranges from 2 wt. % to 6 wt. %, based on the weight of an antifreeze concentrate.

31. The process of claim 25, wherein the pH of said concentrate ranges from 7.0 to 9.5.

32. The process of claim 25, wherein the dynamic pump cavitation rating of said concentrate subjected to and tested under ASTM 2809 conditions is 8 or greater.

33. The process of claim 25, wherein said concentrate has an RI of less than −35° F. when subjected to and tested under ASTM D-1177 conditions.

34. The process of claim 33, wherein said concentrate passes the Glassware Corrosion rating, when subjected to and tested under ASTM D-1384 at ATI standard conditions.

35. The process of claim 34, wherein said concentrate has the following Glassware Corrosion rating, when subjected to and tested under ASTM D-1384 at standard conditions:
   a) less than 5 mg copper loss;
   b) less than 5 mg solder loss;
   c) less than 5 mg brass loss;
   d) less than 5 mg steel loss;
   e) less than 5 mg cast iron loss;
   f) less than 15 mg cast aluminum loss.

36. The process of claim 34, wherein said concentrate has an HSAT rating of less than 0.2 $mg/cm^2/wk$ when subjected to and tested under ASTM D-4340 conditions.

37. The process of claim 34, wherein said concentrate is Shelf Stable without visible particle formation by naked eye.

38. The process of claim 25, comprising:
   a) 90 wt. % or more of ethylene glycol, propylene glycol, or recycled ethylene glycol;
   b) from 0.75 wt. % to 2 wt. % of benzoic acid;
   c) from 1.5 wt. % to 3 wt. % of octanoic acid;
wherein the molar ratio of c) to b) is greater than 0.5: 1.

39. The process of claim 25, wherein the weight ratio of monocarboxylic acid to benzoic acid ranges from 1.1:1 to 3:1.

40. The process of claim 25, further comprising an alkali metal hydroxide, a non-ionic surfactant, and an aromatic triazole or the salt thereof.

41. The process of claim 25, wherein the concentrate consists essentially of ethylene glycol, benzoic acid, the monocarboxylic acid, an alkali metal hydroxide, a non-ionic surfactant, and an aromatic triazole or the salt thereof.

42. The process of claim 25, wherein the molar ratio of c) to b) is greater than 0.5:1.

43. The process of claim 25, wherein the molar ratio of c) to b) is 0.65:1 or greater.

44. The process of claim 25, wherein the molar ratio of c) to b) is 0.8:1 or greater.

45. The process of claim 25, wherein the molar ratio of c) to b) is 1:1 or greater.

46. The process of claim 28, wherein more, and the amount of the $C_7$–$C_{14}$ monocarboxylic acid is 1.0 wt. % or more, each based on the weight of the concentrate.

47. The process of claim 46, wherein the amount of benzoic acid is 1.0 wt. % or more, and the amount of the $C_7$–$C_{14}$ monocarboxylic acid is 1.5 wt. % or more, each based on the weight of the concentrate.

48. The process of claim 47, comprising 90 wt. % or more of ethylene glycol, based on the weight of the concentrate, and said monocarboxylic acid comprises an octanoic acid.

49. The process of claim 25, wherein said alkylene glycol comprises 90 wt. % or more of ethylene glycol.

50. The process of claim 25, wherein said alkylene glycol comprises 90 wt. % or more of propylene glycol.

51. The process of claim 25, wherein said alkylene glycol comprises recycled ethylene glycol.

* * * * *